(12) United States Patent
Mauney

(10) Patent No.: US 12,444,926 B2
(45) Date of Patent: Oct. 14, 2025

(54) SYSTEM AND METHOD FOR ELIMINATING NUISANCE FUSE OPERATION ASSOCIATED WITH MEDIUM VOLTAGE DISTRIBUTION TRANSFORMERS

(71) Applicant: S&C Electric Company, Chicago, IL (US)

(72) Inventor: Marshall Mauney, Kemah, TX (US)

(73) Assignee: S&C Electric Company, Chicago, IL (US)

( * ) Notice: Subject to any disclaimer, the term of this patent is extended or adjusted under 35 U.S.C. 154(b) by 404 days.

(21) Appl. No.: 18/080,824

(22) Filed: Dec. 14, 2022

(65) Prior Publication Data

US 2023/0238796 A1    Jul. 27, 2023

Related U.S. Application Data

(60) Provisional application No. 63/301,826, filed on Jan. 21, 2022.

(51) Int. Cl.
*H02H 7/22* (2006.01)

(52) U.S. Cl.
CPC ..................... *H02H 7/22* (2013.01)

(58) Field of Classification Search
CPC ................. H02H 7/261; H02H 7/22
USPC ............................................ 361/63
See application file for complete search history.

(56) References Cited

U.S. PATENT DOCUMENTS

2007/0211401 A1*  9/2007  Mak ............... H02H 7/261
                                                361/119
2018/0233895 A1*  8/2018  O'Regan ....... H02J 13/00034

OTHER PUBLICATIONS

"TripSaver II Cutout-Mounted Recloser" Feb. 2017 (Year: 2017).*

* cited by examiner

*Primary Examiner* — Kevin J Comber

(57) ABSTRACT

A system and method for clearing overcurrent in a power distribution network. The network includes a feeder, a lateral line coupled to the feeder, a lateral line current interrupting device provided where the lateral line is coupled to the feeder, a plurality of service lines coupled to the lateral line, a distribution current interrupting device provided where a service line is coupled to the lateral line and a distribution transformer provided at each location where a service line is coupled to the lateral line. The method includes setting an operating time of the lateral line interrupting device to be longer than an operating time of the distribution interrupting devices, detecting overcurrent by the lateral line interrupting device and at least one of distribution interrupting devices, and operating the at least one the distribution interrupting device and not operating the lateral line interrupting device in response to detecting the overcurrent.

7 Claims, 4 Drawing Sheets

SYSTEM AND METHOD FOR ELIMINATING NUISANCE FUSE OPERATION ASSOCIATED WITH MEDIUM VOLTAGE DISTRIBUTION TRANSFORMERS

CROSS-REFERENCE TO RELATED APPLICATION

This application claims the benefit of priority from the U.S. Provisional Application No. 63/301,826, filed on Jan. 21, 2022, the disclosure of which is hereby expressly incorporated herein by reference for all purposes.

BACKGROUND

Field

This disclosure relates generally to a method for clearing overcurrent in a power distribution network and, more particularly, to a method for clearing overcurrent in a power distribution network and in connection with distribution transformers.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders that carry the same current for balanced loading but are 120° apart in phase. three-phase and single-phase lateral lines are tapped from the feeders that provide the medium voltage to distribution lines that each include a distribution transformer, where the voltage is stepped down to a low voltage and is provided to loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit, which may cause the current flow from the substation to significantly increase, for example, many times above the normal current, along the fault path. This amount of current causes the electrical lines to significantly heat up and possibly melt, and also could cause mechanical damage to various components in the substation and in the network.

Fault interrupting devices, for example, single phase self-powered magnetically actuated reclosers that employ vacuum interrupters, are provided on utility poles and in underground circuits along a power line to allow or prevent power flow downstream of the recloser. Reclosers and fault interrupters of this type typically detect the current and/or voltage on the line to monitor current flow and have controls that indicate problems with the network circuit, such as detecting a high current fault event. For example, a recloser may employ a Rogowski coil, well known to those skilled in the art, that is wrapped around the power line and measures current flow on the line by the voltage that is induced in the coil being proportional to the rate of change of current flow. If such a high fault current is detected the recloser is opened in response thereto, and then after a short delay closed to determine whether the fault is a transient fault. If high fault current flows when the recloser is closed after opening, it is immediately re-opened. If the fault current is detected a second time, or multiple times, during subsequent opening and closing operations indicating a persistent fault, then the recloser remains open, where the time between detection tests may increase after each test. For a typical reclosing operation for fault detection tests, about 3-6 cycles or 50 to 100 ms of fault current pass through the recloser before it is opened, but testing the circuit by reclosing after shifting to on delayed curves can allow fault current to flow for much longer times, which could cause significant stress on various components in the network.

Traditionally, a fuse is employed as a primary overload protection device for protecting distribution transformers that has a certain rating so that the fuse will operate above a transformer inrush current, but below a transformer through fault protection withstand or damage curve. Much engineering goes into determining what fuse would be best for what transformer and for what application so that it operates at the desired time. Primary overload protection is also expected to protect the transformer from damage due to long overloads and secondary faults by removing the transformer from service after a severe overload of significant time duration. Secondary faults producing winding currents that are many times full load magnitude should also result in operation of the protection device before thermal or mechanical damage occurs to the transformer. In all applications, the primary protective device for a pole-type distribution transformer should maintain proper coordination with upstream devices. It must be the first device to trip, thus avoiding the operation of upstream devices that result in a large number of affected customers. Primary protection of pole-type distribution transformers must be the fastest in the system, but only tripping when it is necessary.

Utilities also often employ surge arrestors connected at distribution transformers to protect the transformer from potentially damaging voltage transient events, such as lightning strikes, that are often too fast to operate a fuse. Surge arrestors reduce transient voltages by shunting the transient energy to a ground connection. This creates a very short current spike that can range from small currents to those in excess of 10 kA. While this approach can effectively reduce or eliminate transformer damage from transients, it can also cause unnecessary distribution system outages on the lateral or feeder, due to both the way in which the surge arrestor acts to clamp the transient voltage and its behavior when it reaches the end of its useful life.

The most common surge arrestor construction uses a metal oxide varistor (MOV) as the active component. When a MOV-based surge arrestor reaches end of life, it will normally fail and become a pure conductor, creating an effective bolted fault between the connected line and the surge arrestor's ground connection. Many newer MOV-based surge arrestors incorporate a ground lead disconnect (GLD) that acts as a fuse to remove the surge arrestor from the circuit when it reaches end of life.

The very high, but short current pulses described above do not carry enough energy to exceed the time current characteristic (TCC) curve of a standard transformer fuse, but may deliver enough energy to damage the internal structure of the fuse, thus changing the effective TCC curve. Over time, repeated transient events can cause a fuse to weaken and eventually operate (open) at a much lower current than the design intent, sometimes referred to as "sneak-outs".

Many utilities adopt a design practice of installing the surge arrestor upstream of the transformer fuse to avoid the fuse mis-operations. This practice reduces the incidence of fuse damage and resulting mis-operation, but also creates some side effects. In order to effectively clamp a transient voltage, a surge arrestor should be connected as close as possible to the transformer, to minimize any impedance between the two devices. Placing the fuse between the surge arrestor and transformer adds a small but significant amount of impedance, and thus reduces the effectiveness of the surge arrestor.

When a MOV-based surge arrestor reaches end-of-life and becomes a bolted fault, the current from this event will be very near the available fault current at the location of the surge arrestor. Thus, it will almost always result in a fuse operating. Even if the surge arrestor is equipped with a GLD, the fault is likely to remain active until the next voltage zero current crossing. Since the fault current is likely to be in the instantaneous range for any upstream fuse or other protective device, surge arrestor end-of-life generally results in an upstream fuse operation, thus creating an outage that requires a line crew to replace both the upstream fuse and at the surge arrestor location to restore power.

When a surge arrestor is mounted upstream of a transformer fuse, the upstream fuse operation described above may occur on the feeder or at the lateral-feeder tie point. This results in a widespread outage affecting a far greater portion of the distribution grid than just the distribution transformer where the failed surge arrestor is located. In cases where there are multiple fuses in series, several fuses may all operate, as the fault current can be high enough to operate them all in the first half-cycle. In this case, line crews may be required to go to multiple locations to completely restore the distribution grid.

It has become increasingly popular to replace the traditional fuse with a fault interrupting or reclosing device at the location where a distribution lateral line is tapped off of a main three-phase feeder and at the location where a distribution transformer is connected to a lateral or service line to overcome some of the problems discussed above. For example, these devices allow a surge arrestor to be coupled directly to the distribution transformer. These devices also reduce the number of service calls to replace fuses in response to temporary faults that can be cleared by the fault interrupting device. One available device that can be used at the location where a distribution lateral line is tapped off of a main three-phase feeder is the TripSaver II™ cut-out mounted recloser available from S&C Electric Company, Chicago, Ill., USA and one available device that can be used at the location where a distribution transformer is connected to a lateral or service line is the VacuFuse™ transformer protector also available from S&C Electric Company.

SUMMARY

The following discussion discloses and describes a system and method for clearing overcurrent in a power distribution network. The power distribution network includes a feeder, a lateral line coupled to the feeder, a lateral line current interrupting device provided at a location where the lateral line is coupled to the feeder, a plurality of service lines coupled to the lateral line, a distribution current interrupting device provided at each location where a service line is coupled to the lateral line and a distribution transformer provided at each location where a service line is coupled to the lateral line. The method includes setting an operating time of the lateral line interrupting device to be longer than an operating time of the distribution interrupting devices, detecting overcurrent by the lateral line interrupting device and at least one of the distribution interrupting devices, and operating the at least one distribution interrupting device and not operating the lateral line interrupting device in response to detecting the overcurrent.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a method for clearing overcurrent in a power distribution network that includes setting an operating time of an interrupting device located at a connection point between a feeder and a lateral line to be longer than an operating time of interrupting devices provided in connection with distribution transformers is merely exemplary in nature, and is in no way intended to limit the disclosure or its applications or uses.

Figure 1:
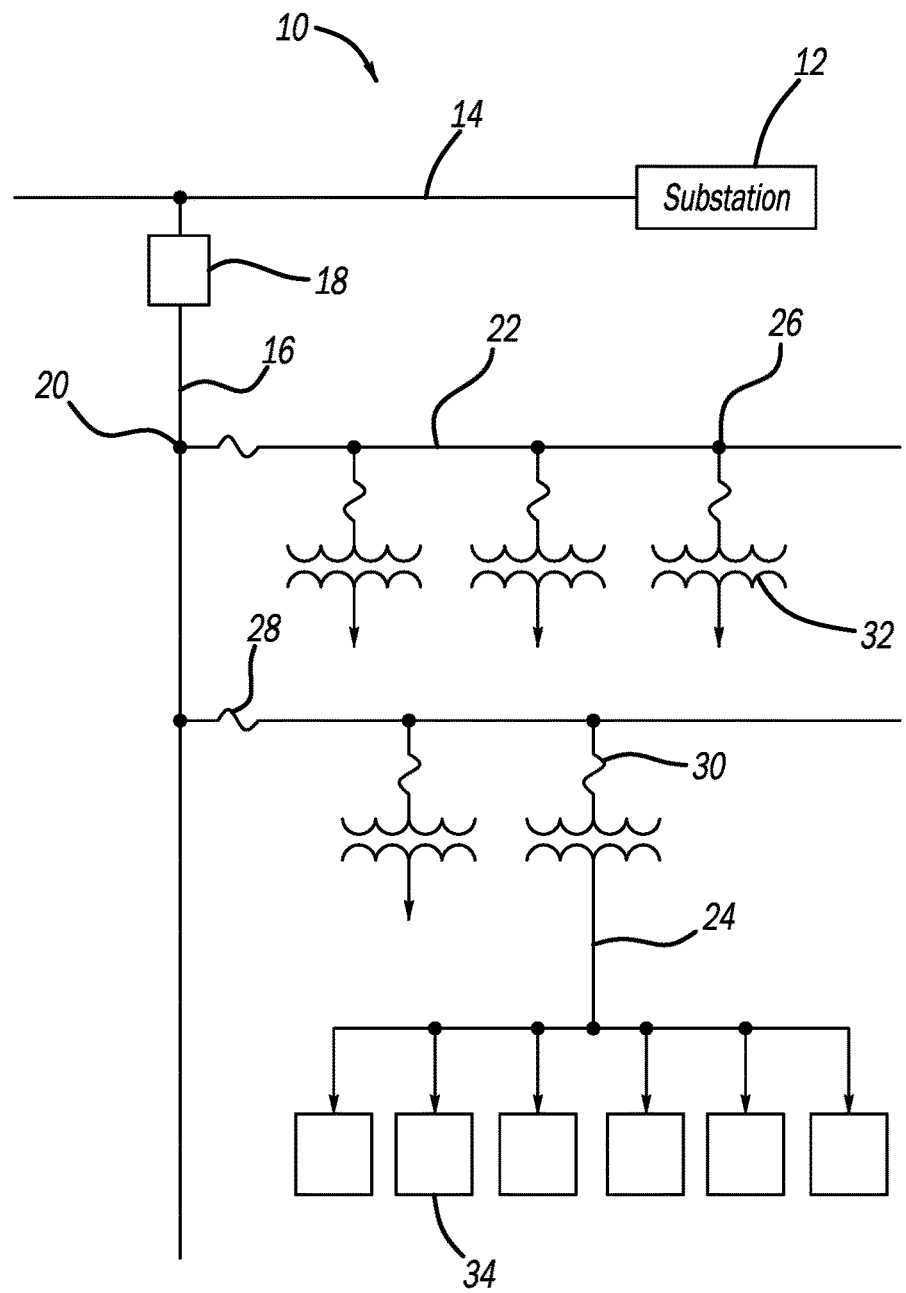
FIG. 1 is a schematic type diagram of an electrical power distribution network including fuses.

FIG. 1 is a schematic type diagram of an electrical power distribution network 10 including an electrical substation 12 that steps down high voltage power on a high voltage power line (not shown) to medium voltage power, such as 12-47 kV, provided on a substation bus 14. A three-phase feeder 16 is connected to the bus 14 and a three-phase recloser 18 is provided proximate the connection point between the feeder 16 and the bus 14. The network 10 also includes single-phase lateral lines 22 coupled to the feeder 16 usually at a utility pole 20 and a secondary service lines 24 coupled to each lateral line 22 usually at a utility pole 26, where a lateral fuse 28 is provided at the connection point between each lateral line 22 and the feeder 16 and a primary fuse 30 is provided at the connection point between each lateral line 22 and each service line 24. A distribution transformer 32 is provided at the beginning of each service line 24 that steps down the voltage from the medium voltage to a low voltage to be provided to loads 34, such as homes.

As mentioned above, it has been proposed in the art to replace the fuses 28 and 30 with electronic current interrupting devices, such as single-phase self-powered magnetically actuated devices that employ vacuum interrupters. These devices typically employ sensors for measuring the current and/or voltage of the power signal propagating on the line, a controller for processing the measurement signals and controlling the position of the vacuum interrupter, and a transceiver for transmitting data and messages to a control facility (not shown) and/or to other reclosers and components in the network 10. Replacing all of the fuses on a power system's distribution lateral lines with intelligent interrupting devices as described above will prevent the multiple mis-operation scenario described above. This approach will also eliminate sustained outages caused by surge arrestor end-of-life events, while also eliminating fuse damage from transients at all locations along the feeder 16 and/or lateral lines 22.

Figure 2:
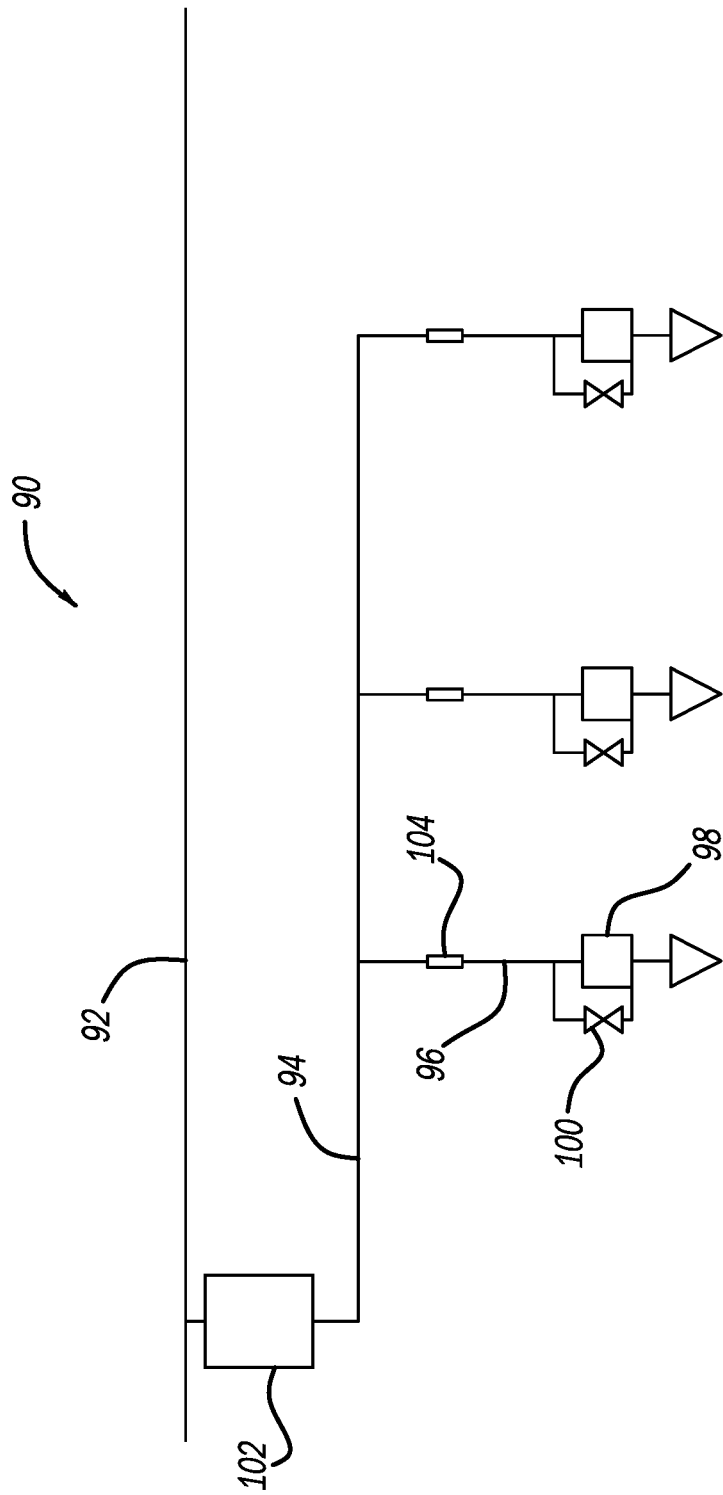
FIG. 2 is a schematic type diagram of another electrical power distribution network including current interrupting devices.

FIG. 2 is a schematic type diagram of an electrical power distribution network 90 that is similar to the network 10, but where the fuses 28 and 30 have been replaced with current interrupting devices. The network 90 includes a three-phase feeder 92, a single-phase lateral line 94 tapped off of the feeder 92 and service lines 96 tapped off of the lateral line 94. Each service line 96 includes a distribution transformer 98 that is protected by a surge arrestor 100. A cutout mounted reclosing device 102 is provided at the location where the lateral line 94 is tapped off of the feeder 92 and a self-resetting interrupting device 104 is provided on the service line 96 between the location where the service line 96 is tapped off of the lateral line 94 and the distribution transformer 98.

Figure 3:
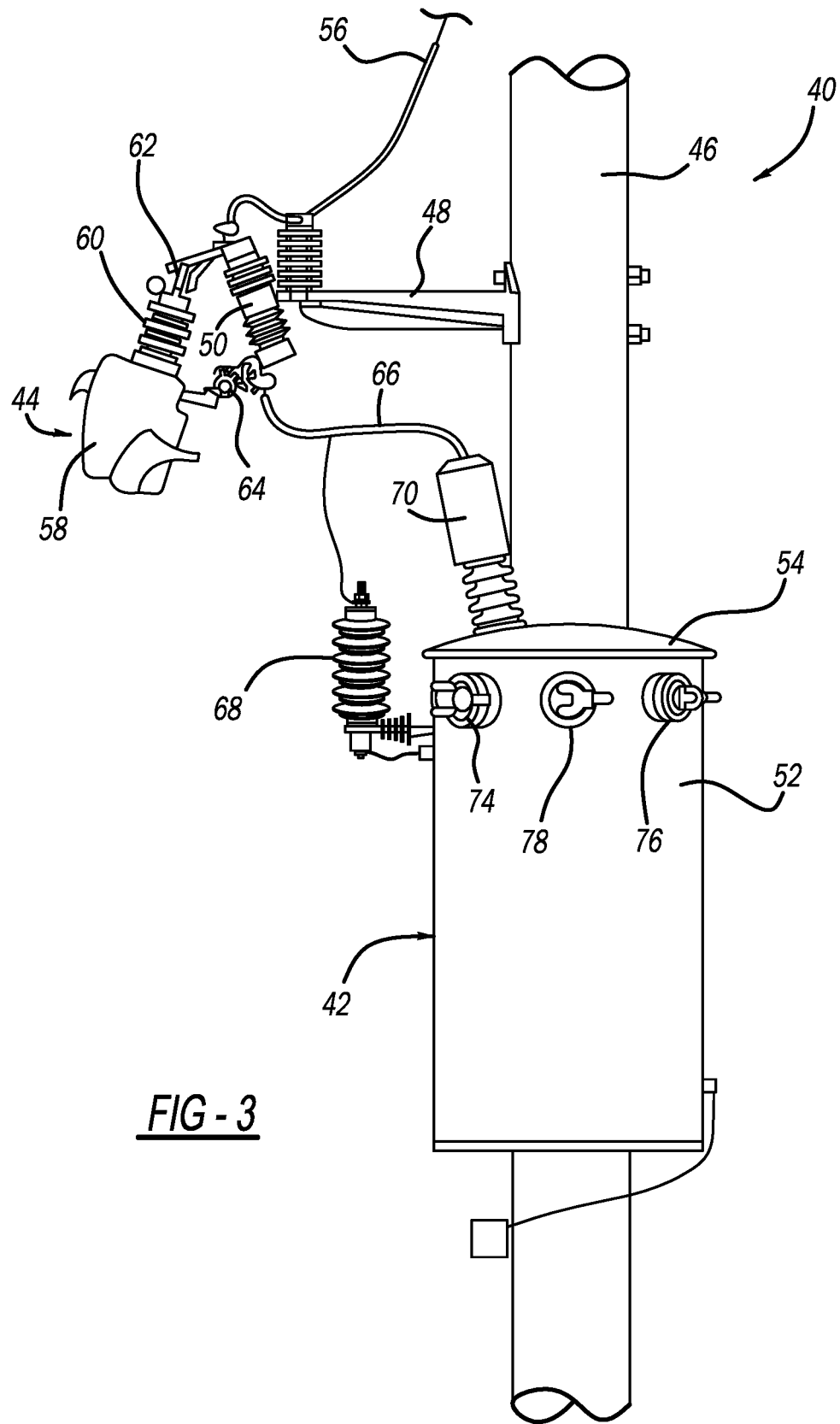
FIG. 3 is an illustration of a pole mounted transformer system including a distribution transformer and a current interrupting device.

FIG. 3 is an illustration of a pole mounted transformer system 40 showing one configuration for the distribution transformer 98 and the device 104. The system 40 includes a distribution transformer 42 mounted to a utility pole 46 and a self-resetting current interrupting device 44 mounted to the utility pole 46 by a mount 48 and an insulator 50, where the interrupting device 44 replaces the traditional fuse 30.

The transformer 42 includes an outer tank 52 that is generally cylindrically shaped having a cover or lid 54 that is typically filled with insulating fluid, such as mineral oil, that houses the primary and secondary coils and the transformer core assembly. The transformer 42 will have a certain size and power rating based on the amount of load it services, a primary voltage at the terminals of the primary coil during normal operation, a normal full load or base current calculated using nameplate kVA and voltage and a current overload percentage that allows the transformer 42 to operate a certain percentage above its normal load for a certain amount of time. In one non-limiting example merely for representative purposes, the transformer 42 may have a power rating of 25 kVA (kilovolt-ampere), a primary voltage of 7.2 kV, a base current of 3.5A and an overload percentage of 250%.

The interrupting device 44 is intended to represent any fault interrupting device of the type discussed above, such as a single-phase self-powered magnetically actuated recloser that employs a vacuum interrupter, suitable for performing current interrupting operations at a location where a power line 56 is tapped off of a lateral line (not shown). The interrupting device 44 includes a vacuum interrupter 60 and an enclosure 58 housing all of the actuators, electronics, components, sensors for measuring and harvesting current, controllers, processors, communications devices, etc. for operating the interrupting device 44 as discussed herein. If the interrupting device 44 performs current detecting operations and the fault current is still present and repeated current interruption is required, it will be released from a connector 62 and pivot on a hinge 64 to provide a visual indication that is has operated.

The power line 56 at medium voltage that is tapped off of the service line 96 is electrically coupled to one terminal of the interrupting device 44 and a power line 66 at medium voltage is electrically coupled to the other terminal of the interrupting device 44 and the primary winding in the transformer 42 through a bushing 70, where the bushing 70 includes an internal conductor and an outer insulation body. A surge arrestor 68 is coupled to the line 66 and the tank 52 to provide over-voltage protection from, for example, lightning strikes that may have a duration much less than the response time of the interrupting device 44, but could otherwise cause a traditional fuse to mis-operate or be damaged. The transformer 42 steps down the medium voltage on the line 66 to a lower voltage, and, in this example, provides 120 volt power at a terminal 74 or 76 and a ground terminal 78 and 240 volt power between the terminals 74 and 76, where the ground terminal 78 is electrically coupled to a neutral line (not shown) in most applications.

In one embodiment when used in combination with the distribution transformer 42, the interrupting device 44 interrupts fault current in less than one power line cycle (16.6 msec @60 Hz). This type of device can be designed and manufactured in a way to be tolerant of transient fault currents, thereby not changing its performance after many repeated overcurrent events. This approach completely addresses the fuse damage and resulting mis-operation described above, thus eliminating the sustained outages caused by the described fuse events. As a result, it also allows the surge arrestor 68 to be connected downstream of the device 44 and improves the effectiveness of the surge arrestor 68. Further, by designing the interrupting device 44 to automatically reclose several seconds (5-50) after the initial overcurrent event addresses the need to have a line crew travel to the surge arrestor location to restore power. The surge arrestor 68 will still need to be replaced, but this is not required to restore power.

The reclosing device 102 can be programmed with a minimum trip time for overcurrent events for current above the instantaneous level, causing it to delay its fault clearing operation until after the downstream interrupting devices, i.e., the interrupting device 44 provided in combination with the distribution transformer 42, have operated. In this embodiment, the reclosing device 102 has a definite time function that allows rapid coordination with other interrupting devices. In the case of a single-cycle clearing interrupting device at the distribution transformer 42, this minimum trip can be as short as 2 current cycles (25 msec @60 Hz) assuming the downstream device 44 at the distribution transformers 42 can clear in 1 current cycle or less. This improves on the system concept described above by eliminating the momentary outages caused by series-wired fault clearing devices operating simultaneously on an end-of-life surge arrestor fault.

Figure 4:
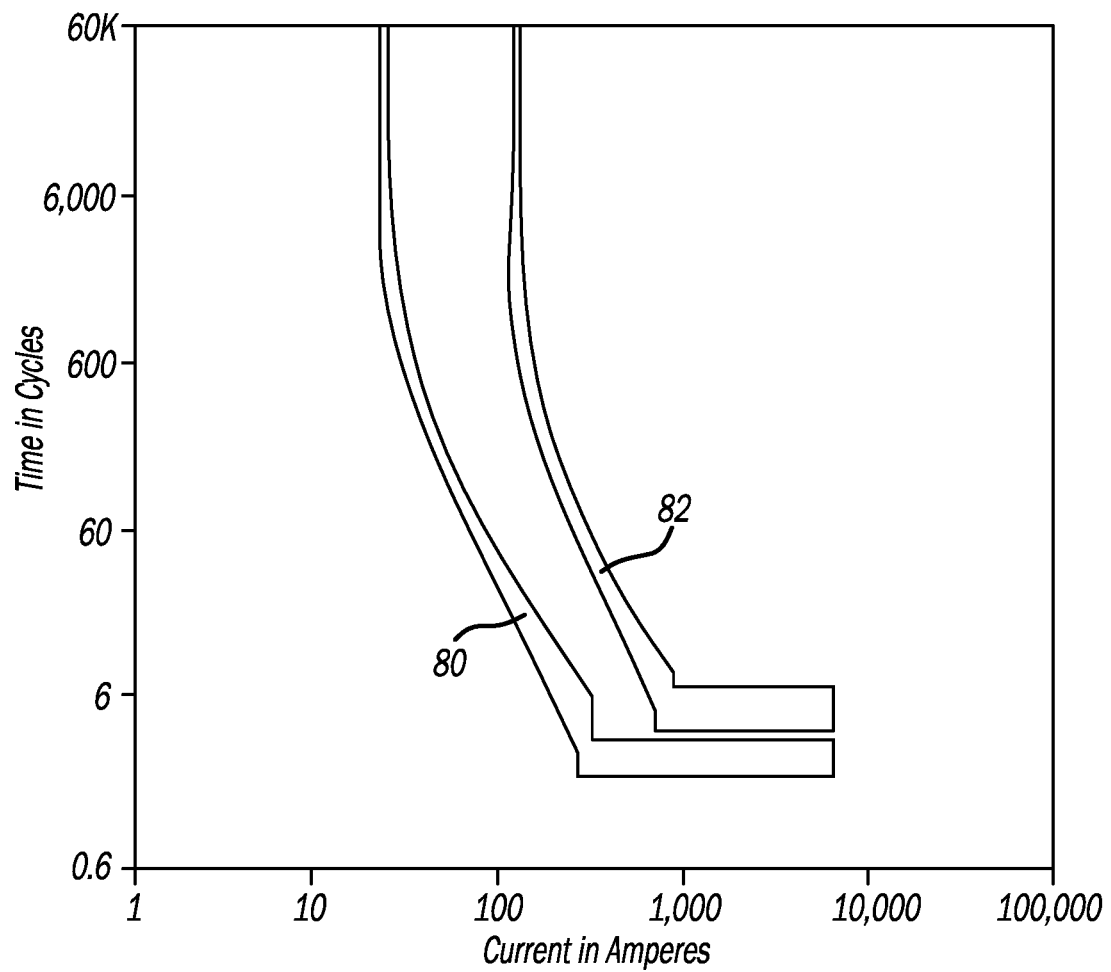
FIG. 4 is a logarithmic graph with current on the horizontal axis and time on the vertical axis showing TCC operating curves for interrupting devices.

This feature can be seen by FIG. 4, which is a logarithmic graph with current in amps on the horizontal axis and time in seconds on the vertical axis. Typically, the operation of interrupting devices used in combination with distribution transformers are programmed to follow the general fuse characteristic of the fuse that that they replace. In this example, TCC operating curve 80 is designed for operating the interrupting device 44 and TCC operating curve 82 is designed for operating the reclosing device 102, where the interrupting device 44 operates faster than the reclosing device 102. Therefore, if overcurrent occurs at the surge arrestor 68, the interrupting device 44 operates before the reclosing device 102 will operate, thus preventing the reclosing device 102 from operating, which reduces the number of customers that are affected by the overcurrent event. In one example, the TCC curve 80 is a standard 10T transformer fuse curve with a 2 cycle minimum clear and the TCC curve 82 is a 50K TCC with a 85 msec definite time element starting at 800 kA.

The foregoing discussion discloses and describes merely exemplary embodiments of the present disclosure. One skilled in the art will readily recognize from such discussion and from the accompanying drawings and claims that vari-

What is claimed is:

1. A system for protecting electrical distribution networks, comprising:
   a plurality of intelligent, self-powered current interrupting devices, each configured to be installed at a distribution transformer and at a lateral line connection;
   wherein each current interrupting device includes a programmable controller configured to:
   detect overcurrent conditions;
   operate within a predetermined time-current characteristic curve, wherein the interrupting device at the distribution transformer is configured to interrupt current within one cycle or less, and the interrupting device at the lateral line is configured to interrupt current after a delay of approximately two cycles;
   automatically reclose after a predefined interval following a temporary fault;
   a surge arrestor positioned downstream of the distribution transformer interrupting device; and
   wherein the system is configured to prevent nuisance operations by coordinating the timing of the interrupting devices to ensure that the distribution transformer interrupting device operates prior to the lateral line interrupting device during fault conditions.

2. The system of claim 1, wherein the programmable controller is further configured to differentiate between temporary and sustained faults by executing multiple reclosing cycles before locking out the interrupting device.

3. The system of claim 1, wherein each current interrupting device includes a vacuum interrupter for enhanced fault-clearing capability.

4. The system of claim 1, wherein the surge arrestor is configured to clamp voltage transients at the distribution transformer, thereby enhancing protection against lightning-induced surges.

5. The system of claim 1, wherein the programmable controller is configured to communicate with a central monitoring system to report fault events and device status.

6. The system of claim 1, wherein the interrupting devices are mounted on the same utility pole as the distribution transformer to minimize installation complexity and improve response time.

7. The system of claim 1, wherein the predefined interval for automatic reclosing is adjustable based on historical fault data to optimize network reliability.

* * * * *